Feb. 15, 1927.

C. J. ERMENTRAUT 1,618,071

SAFETY GAS COCK

Filed Dec. 8, 1926

WITNESSES

INVENTOR
C. J. Ermentraut
BY
ATTORNEY

Patented Feb. 15, 1927.

1,618,071

UNITED STATES PATENT OFFICE.

CHARLES J. ERMENTRAUT, OF NEW YORK, N. Y., ASSIGNOR OF ONE-HALF TO SIGMUND SCHNEEWEISS, OF NEW YORK, N. Y.

SAFETY GAS COCK.

Application filed December 8, 1926. Serial No. 153,398.

My invention relates to safety gas cocks, and more particularly relates to gas cocks controlling the supply of gas to gas stoves, etc.

The general object of my invention is to provide a safety gas cock having a novel auxiliary valve which is maintained open so long as the hose leading to the gas stove is connected to the cock, but which valve will automatically close upon the disconnection of the hose from any cause.

Reference is to be had to the accompanying drawings forming a part of this specification, it being understood that the drawings are merely illustrative of one example of the invention.

Figure 1:
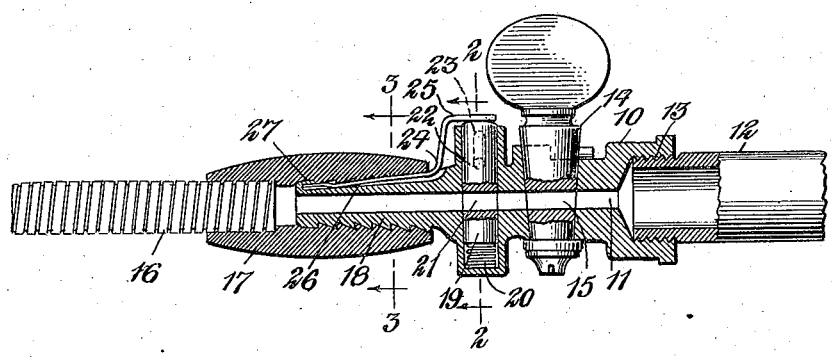

Figure 1 is a longitudinal section of a safety gas cock embodying my invention.

Figure 2:
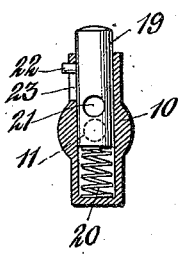
Figure 3:
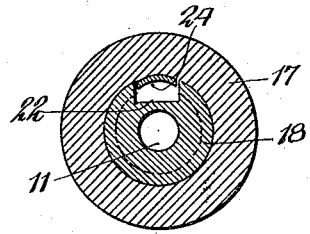

Figures 2 and 3 are transverse vertical sections respectively on the lines 2—2 and 3—3 of Figure 1.

In carrying out my invention in accordance with the illustrated example, a suitable body 10 is provided having a through-bore 11 for the flow of gas through the cock. The numeral 12 indicates the usual gas supply pipe suitably connected as at 13 to body 10 of the cock at one end. The numeral 14 indicates the usual plug or valve of the cock having a bore 15 adapted by the turning of the plug 14 to be brought into or out of register with the bore 11 for permitting the flow of gas or cutting off the same. The numeral 16 indicates the usual hose for connecting up the gas cock and the gas stove or the like, and the numeral 17 indicates the rubber sleeve establishing a connection between the hose 16 and the terminal nipple 18 of the gas cock.

In accordance with my invention I provide an auxiliary valve 19 which in practice consists of a cylindrical plug disposed in the body 10 transversely of the bore 11. Said plug valve 19 is subject to a coil spring 20 disposed in the bottom of the body 10 beneath the valve 19 normally tending to move said valve to a position to cut off the flow of gas through bore 11.

The valve 19 has a transverse port 21 that may be brought into or out of register with the bore 11. Stop means are provided to limit the movement of the valve 19 under the action of the spring 20; said stop may consist of a pin 22 on said valve 19, said pin being movable in a slot 23 in body 10.

I provide a plate spring 24 having an offset end 25 lying over the valve 19. Said spring 24 lies for its major portion in a groove 26 in the terminal nipple 18 so that it may be depressed to lie flush with or within the peripheral surface of said terminal 18. That end of the spring 24 opposite the offset end 25 extends beneath an overhanging lip 27 formed on terminal 18 at an end of groove 26. The arrangement is such that the rubber sleeve 17 when forced on to the terminal 18 stresses the spring 24 and depresses the same within the periphery of said terminal 18 so as to make a gas tight connection with said terminal. The depression of the spring 24 by the placing of sleeve 17 causes the offset end 25 to force the plug valve 19 against the pressure of spring 20 to a position with the port 21 of said plug in register with the bore 11 to permit the flow of gas through the cock. Obviously, should the sleeve 17 be pulled from the terminal 18 the spring 24 will react so that its offset end 25 will relieve the pressure of said spring on the plug valve 19 thereby permitting the spring 20 to expand and move the said valve 19 to a position cutting off the flow of gas by moving the port 21 out of register with bore 11. Thus the usual plug valve 14 of the gas cock may be left in open position for the flow of gas and reliance then may be had on the automatic closing of the cock at the valve 19 whenever the sleeve 17 is pulled from the terminal 18 of the cock. That portion of the spring 24 engaged by sleeve 17 and accommodated in groove 26 is curved in cross-section for the making of a tight joint between terminal 18 and said sleeve 17.

I would state furthermore, that while the illustrated example constitutes a practical embodiment of my invention, I do not limit myself strictly to the exact details herein illustrated, since, manifestly, the same can be considerably varied without departure from the spirit of the invention.

What I claim is:

1. A safety gas cock including a body having a bore for the flow of gas therethrough, a transversely disposed valve having a port adapted to be moved into or out of register with said bore, a plate spring, said body at one end having a groove accommodating a portion of said spring, the said spring being rounded in cross-section for the portion lying in said groove, and having an offset end bearing against said valve, said body at its grooved portion being adapted to receive an element adapted to form a connection between the gas cock and the gas hose leading to the point of discharge of the gas, said element fitting an end of said gas cock and adapted to engage said spring to depress the same within the groove of the body and thereby cause the offset portion to exert pressure against said valve, and a spring beneath said valve and tending to move the valve automatically to the closed position with its port out of register with the bore of the body whenever said element is detached from the gas cock and the pressure of said element removed from said first mentioned spring.

2. A safety gas cock including a body having a bore for the flow of gas therethrough, a transversely disposed valve having a port adapted to be moved into or out of register with said bore, and a spring engaging said valve and adapted to lie within the surface of said body at an end thereof whereby to be depressed by the terminal sleeve of a gas hose when said sleeve is engaged with said end of the body; together with a spring acting on said valve and normally tending to move the valve to the closed position when the pressure on the first mentioned spring is relieved.

CHARLES J. ERMENTRAUT.